(12) United States Patent
Gläßer et al.

(10) Patent No.: US 12,397,492 B2
(45) Date of Patent: Aug. 26, 2025

(54) METHOD FOR PRODUCING A SANDWICH COMPOSITE COMPONENT WITH PRESSED TWO OR THREE-DIMENSIONAL SHAPE AND SUCH A COMPOSITE COMPONENT

(71) Applicant: Fraunhofer-Gesellschaft zur Förderung der angewandten Forschung e. V., Munich (DE)

(72) Inventors: Thomas Gläßer, Halle (DE); Matthias Zscheyge, Halle (DE); Peter Stache, Halle (DE); Kay Kölzig, Halle (DE)

(73) Assignee: FRAUNHOFER-GESELLSCHAFT ZUR FÖRDERUNG DER ANGEWANDTEN FORSCHUNG E. V., Munich (DE)

( * ) Notice: Subject to any disclaimer, the term of this patent is extended or adjusted under 35 U.S.C. 154(b) by 18 days.

(21) Appl. No.: 17/599,388

(22) PCT Filed: Mar. 18, 2020

(86) PCT No.: PCT/EP2020/057508
§ 371 (c)(1),
(2) Date: Sep. 28, 2021

(87) PCT Pub. No.: WO2020/200796
PCT Pub. Date: Oct. 8, 2020

(65) Prior Publication Data
US 2022/0193978 A1    Jun. 23, 2022

(30) Foreign Application Priority Data

Mar. 29, 2019   (DE) ..................... 10 2019 204 460.3

(51) Int. Cl.
B29C 51/08 (2006.01)
B29C 35/08 (2006.01)
(Continued)

(52) U.S. Cl.
CPC ........ B29C 51/082 (2013.01); B29C 35/0805 (2013.01); B29C 51/14 (2013.01);
(Continued)

(58) Field of Classification Search
CPC .............. B29C 35/0805; B29C 70/345; B29C 2035/0822; B29C 51/082; B29C 51/14;
(Continued)

(56) References Cited

U.S. PATENT DOCUMENTS 10,786,977 B2 *   9/2020   Dodworth ............... B29C 70/02
2009/0072441 A1 * 3/2009   Bracke ................. B31D 3/0284
                                                                264/271.1
(Continued)

FOREIGN PATENT DOCUMENTS

DE        4323590 A1     3/1994
DE     10228406 A1 *    1/2003   ........... B29C 70/088
(Continued)

OTHER PUBLICATIONS

English translation of KR-100607567-B1. (Year: 2006).*
(Continued)

*Primary Examiner* — Xiao S Zhao
*Assistant Examiner* — Inja Song
(74) *Attorney, Agent, or Firm* — Fitch, Even, Tabin & Flannery LLP (57) ABSTRACT

A method for producing a sandwich composite component and a sandwich composite component are described having a pressed two- or three-dimensional shape, at least one structured core layer is made of thermoplastic material which has two opposite core layer surfaces which are bonded to a thermoplastic cover layer. A sandwich composite component is also described.

9 Claims, 3 Drawing Sheets

(51) Int. Cl.

| | |
|---|---|
| *B29C 51/14* | (2006.01) |
| *B29C 51/42* | (2006.01) |
| *B29C 70/34* | (2006.01) |
| *B29K 101/12* | (2006.01) |
| *B29K 105/08* | (2006.01) |
| *B32B 3/12* | (2006.01) |
| *B32B 3/26* | (2006.01) |
| *B32B 5/02* | (2006.01) |
| *B32B 27/08* | (2006.01) |
| *B32B 27/12* | (2006.01) |

(52) U.S. Cl.
CPC .......... *B29C 51/421* (2013.01); *B29C 70/345* (2013.01); *B32B 3/12* (2013.01); *B32B 3/263* (2013.01); *B32B 5/024* (2013.01); *B32B 27/08* (2013.01); *B32B 27/12* (2013.01); *B29C 2035/0822* (2013.01); *B29K 2101/12* (2013.01); *B29K 2105/0845* (2013.01)

(58) Field of Classification Search
CPC ..... B29C 43/14; B29C 43/146; B29C 43/203; B29C 43/32; B29C 43/36; B29C 2043/147; B29C 51/087; B29C 2043/3605; B29C 2043/143; B32B 3/12; B32B 3/263; B32B 2250/03; B32B 2310/0825; B32B 37/04; B32B 41/00; B32B 38/1866; B32B 37/146; B32B 2250/40; B32B 2260/046; B32B 38/1858; B29K 2101/12; B29K 2105/0845; B30B 15/064
See application file for complete search history.

(56) References Cited

U.S. PATENT DOCUMENTS

| | | | | |
|---|---|---|---|---|
| 2009/0294041 | A1* | 12/2009 | Schellhase | B29C 51/32 |
| | | | | 156/245 |
| 2015/0050446 | A1* | 2/2015 | Stamp | B29C 43/52 |
| | | | | 428/73 |
| 2016/0214308 | A1 | 7/2016 | Iwano | |
| 2016/0354967 | A1* | 12/2016 | Ono | B29C 70/46 |
| 2017/0066201 | A1* | 3/2017 | Bieder | B42B 4/00 |
| 2018/0001593 | A1 | 1/2018 | Orth et al. | |

FOREIGN PATENT DOCUMENTS

| | | | | |
|---|---|---|---|---|
| DE | 102012002559 A1 | 9/2012 | | |
| DE | 102011006819 A1 | 10/2012 | | |
| DE | 102015007919 A1 * | 12/2015 | ........... | B32B 27/065 |
| DE | 102016121736 A1 * | 5/2018 | ........... | B29C 51/145 |
| EP | 0894611 B1 | 2/1999 | | |
| EP | 1626852 B1 | 7/2007 | | |
| EP | 1993808 B1 | 7/2010 | | |
| EP | 3263321 A1 | 1/2018 | | |
| KR | 100607567 B1 * | 8/2006 | ............ | B29C 43/36 |
| WO | 2013/143569 A1 | 10/2013 | | |

OTHER PUBLICATIONS

English translation of DE-102015007919-A1. (Year: 2015).*
English translation of DE-102016121736-A1 by EPO. (Year: 2018).*
English translation of DE-10228406-A1 by EPO. (Year: 2003).*
International Search Report for PCT/EP2020/057508, mailed Oct. 1, 2020; English translation submitted herewith (9 pgs.).

* cited by examiner

METHOD FOR PRODUCING A SANDWICH COMPOSITE COMPONENT WITH PRESSED TWO OR THREE-DIMENSIONAL SHAPE AND SUCH A COMPOSITE COMPONENT

CROSS-REFERENCE TO RELATED APPLICATIONS

Reference is made to International Application No. PCT/EP2020/057508, filed Mar. 18, 2020, which claims priority to German Patent Application No. 10 2019 204 460.3, filed Mar. 29, 2019, the contents of which are incorporated herein by reference in their entirety.

BACKGROUND OF THE INVENTION

Field of the Invention

The invention relates to a method for producing a sandwich composite component with pressed two- or three-dimensional shape, having at least one structured core layer made of a thermoplastic material, which has two opposite core layer surfaces, each of which is directly or indirectly bonded to a thermoplastic cover layer.

Description of the Prior Art

Sandwich composite components are used widely in lightweight construction, since they have very high load per unit area characteristics and at the same time low specific density. For structural components which are subject to heavy loads, these sandwich composite components typically include structured core layers, in the form of a honeycomb structure, for example, which is bonded on each side with a fiber-reinforced plastic cover layer. Although it is possible to manufacture large-area, flat sandwich composite components even in large-scale production, there are still not enough production methods with which it is possible to create endless-fiber reinforced sandwich composite components in cycle times in the order of minutes and with specified surface curvatures.

Methods for large-scale production, particularly of endless-fiber reinforced sandwich components with homogeneously foamed core structures, are very well known. However, sandwich composite components with a foam core have lower specific mechanical rigidities than sandwich composite components with a structured core. Furthermore, the process of foaming the core while simultaneously molding the cover layers that delimit the core on either side is difficult to control.

DE 10 2011 006 819 A1 discloses a method for producing a three-dimensionally contoured sandwich structure having of two thermoplastic cover layers and a core layer having a honeycomb structure positioned between them. In order to achieve the three-dimensional contouring of the sandwich structure, the honeycomb-like core layer is pre-processed in a cutting or separating processing method in order to obtain the intended three-dimensional contour. Afterwards, the thermoplastic cover layers are bonded cohesively with the core layer by a process of hot pressing them onto the processed core material. It is quite plain that this approach is only suitable for low volume production or prototype construction.

DE 43 23 590 A1 discloses a method for producing a three-dimensionally shaped layer composite component whose core layer of foamed thermoplastic material is bonded cohesively with thermoplastic cover layers on both sides. In this process, the core layer and the cover layers are first arranged in a loose stack configuration and then joined in a single hot pressing process. During the hot pressing process, the two cover layers and the core layer each form a cohesive composite bond.

A method for producing a sandwich panel with a reinforced foam core which is similar to the preceding manufacturing method is disclosed in EP 3 263 321 A1. However, in the cases cited above, the foam core does not have surface rigidity and surface load-bearing capacity that is associated with a structured core layer.

WO 2013/143569 A1 discloses a manufacturing method for a sandwich composite component having a honeycomb core layer and two fiber-reinforced thermoplastic cover layers. The special feature of the disclosed sandwich component is that the honeycomb core layer is made from a cellulose-based material which assumes a correspondingly three-dimensionally configured component shape under the effects of pressure and heat as part of a deformation process.

Besides the above, a number of production methods involving processing thermosets for producing sandwich composite components are known, such as vacuum infusion, gap impregnation or resin injection methods. However, the curing reaction of thermosetting plastics during processing and the fact that some process steps are performed manually results in them being of limited benefit, if not entirely unsuitable for large-scale manufacturing.

EP 1 993 808 B1 discloses a method for the production of a 3-dimensionally shaped sandwich structure, which is transferred to a compression mold with compression mold stamps that can be deflected variably one after the other in order to mould it. The internal core layer in the sandwich structure is exposed to varying degrees of compression in different regions, which creases form.

EP 1 626 852 B1 discloses a composite component and a method for production thereof, wherein the component is shaped two-dimensionally in the manner of a deep-drawing method and a thermoplastic material enclosing the periphery thereof is joined to it by compression.

DE 10 2012 002 559 A1 discloses a tool for manufacturing a sandwich composite component which does not contain a thermoplastic material.

t EP 0 894 611 B1 describes a method for producing a component for motor vehicles by pressing a panel comprising at least a first and a second cover layer as well as a cellular core of thermoplastic material positioned between them. Both cover layers are made of a reinforced thermoplastic material. Additional material reservoirs are formed in regions having shape-induced curvatures which counteracts a local reduction in thickness wherever curvature occurs.

SUMMARY OF THE INVENTION

The problem addressed by the invention is developing a method for producing a sandwich composite component with a pressed two- or three-dimensional shape having at least one structured core layer which is made of thermoplastic material and has two opposite core layer surfaces, each are directly or indirectly cohesively bonded to a thermoplastic cover layer, in such manner that large-scale manufacturing on an industrial scale is possible, and which further enables the production of at least one of a flat and a slightly to moderately curved sandwich composite component in specifically predefined regions of the component which each have a defined core layer height. It should further be possible to create sandwich composite components with a fluid-tight component periphery, whereby the interior structured core layer is protected from the external atmosphere. In this way, it should be possible to produce ready-for-use sandwich composite components in no more than a few minutes, which are consequently available in large numbers and with a long service life.

The method for producing a sandwich composite component with a pressed two- or three-dimensional shape has the following method steps:

The first step is to heat a flat, sandwich semi-finished product containing the at least one structured core layer with the cover layers joined at the core layer surfaces by infrared radiation. The joining by infrared radiation is preferably contactlessly, so that in the regions that are to be formed occur with the structured core layer having a temperature lower than a melting point of the thermoplastic material of the core layer, and at least part of each of the two cover layers have a temperature equal to or higher than a melting point associated with the thermoplastic material of the cover layers. In this way, it is ensured that the structure of the core layer can be molded and retain its structure during the molding compression, and both cover layers are involved with cohesive bonding to the core layer surfaces at the end of molding. The cover layers are each made of a thermoplastic material which preferably is the same thermoplastic material or a thermoplastic material of the same type as that of the structured core layer. This thermoplastic material advantageously is a partly crystalline thermoplastic having a melting temperature which constitutes the crystalline melting temperature. Additionally, the cover layers preferably contain structure-reinforcing endless fiber components having fiber lengths measuring more than 2 cm. The individual fibers are arranged haphazardly or ideally pass completely through the semi-finished product once and are arranged approximately unidirectionally or are in a woven structure in at least one layer. The heating of the cover layers to above the softening or melting temperature of the thermoplastic matrix also allows the fiber components to slide inside the softened cover layers and over the core layer surfaces. In flat semi-finished product regions, where shaping is not intended to take place, it may further be advantageous not to melt the cover layers.

In a preferred variant, besides the thermoplastic, the core layer also contains at least one filling material chosen from the following materials: talcum particles, chalk particles, glass flour or powder and short fibers made of the fiber materials listed earlier, each of which are contained in the cover layers.

Then, the heated, hitherto flat sandwich semi-finished product is transferred into a pressing tool comprising at least two pressing mold halves which are mounted to be linearly movable relative to each other along a spatial axis, with at least a first pressing mold halve having at least two pressing mold segments which are mounted to be linearly movable relative to each other in along a spatial direction. The warmed sandwich semi-finished product is transferred and inserted in the pressing tool in such manner that the sandwich semi-finished product comes into surface contact with at least a region of at least one of the two pressing mould halves. The semi-finished sandwich product preferably bears or rests on the pressing mold halve opposite the pressing mold halve. The at least two pressing mould segments are mounted to be linearly movable relative to each other along the spatial direction. In the following text, this pressing mold halve will be designated the second pressing mold halve for purposes of differentiation.

The warmed sandwich semi-finished product is not necessarily but is advantageously positioned and fixed on the surface of the second pressing mold halve by negative pressure. For this purpose, at least sub-regions of the second pressing mould halve are equipped with vacuum suction elements, which guarantee that the sandwich semi-finished product adheres to the at least one surface of the pressing mold halves profoundly and is secured reliably against lateral slippage.

In the course of a "first process step", both pressing mold halves of the pressing tool are moved towards each other along the spatial direction, such that at least regions of the sandwich semi-finished product come into surface contact with both oppositely disposed pressing mold halves, such that a first pressing mould segment runs ahead of the respective other pressing mold segment of the first pressing mold halve in the direction of movement. That is the first pressing mold segment protrudes beyond the respective other pressing mold segment in the direction of movement by a distance $\Delta x$. In this process, the leading first pressing mold segment comes into surface contact with one of the two cover layers, while the respective other cover surface already bears on the opposite, respective other pressing mold halve, advantageously supported by a vacuum. The further movement of the two pressing mold halves towards each other causes the warmed sandwich semi-finished product to be pre-pressed in two or three dimensions between the first pressing mold segment and the second pressing mold halve, until a first minimum spacing is reached between the first pressing mold segment and the second pressing mold segment. In this case, the first minimum spacing corresponds to a greatest thickness which is assignable to the pre-pressed sandwich semi-finished product. In the case of a honeycomb-like core layer, the honeycomb ridges are preferably orientated parallel to the spatial direction along which the two pressing mold halves move towards each other. The honeycomb cell heights, that is the lengths of the honeycomb ridges, are only reduced with a slight increase in the cover layers, and by an amount depending on the tool gap if at all, during the pressing process. This first pressing process step in which the sandwich is shaped, without a sharp reduction of the core height may also be performed in several stages, from the inside outwards by using a multipart compression mold segment.

The at least one leading pressing mold segment is preferably equipped with vacuum suction elements. The surfaces are aligned to face towards the pressing gap constitute a part of the molding nip. Subsequently, the cover layer surface region which is in contact with the first, leading pressing mold segment, is preferably sucked and fixedly attached to the first pressing mold segment partly or completely by negative pressure. Due to the contact on both sides with the pre-pressed sandwich semi-finished product at the opposite contact regions, the sandwich semi-finished product is cooled by contact cooling. This in turn leads to the partial or complete solidification of the thermoplastic materials of the contacted cover layer regions at the previously melted cover layer surface region. This targeted solidification and the preferably vacuum-based adhesion of the sandwich semi-finished product to the leading pressing mold segment have a stabilizing effect on these sandwich regions. This stabilization reduces or entirely prevents undesirable deformations in the pre-pressed sandwich semi-finished product during the subsequent, second pressing process step.

In the course of the subsequent, second pressing process step, the respective other pressing mold segment of the first pressing mold halve is deflected in the spatial direction onto the opposite, second pressing mold halve, while the first pressing mold segment rests relative to the opposite, second pressing mold halve. That is the sandwich semi-finished product is not exposed to any further pressing forces in the contact region with the first pressing mold segment. Through its deflection, the respective other pressing mold segment comes into contact with the pre-molded sandwich semi-finished product directly or indirectly adjacent to a region that was unaffected by the earlier pre-pressing, until a second minimum spacing is reached between the respective other pressing mold tool and the second pressing mold halve. The second minimum spacing is preferably selected such that the thermoplastic material of the cover layers and of the core layer is compacted in this region to form a multilayer laminate. The pressure prevailing in this pressing step, particularly in the peripheral regions that are to be compacted and the regions of the pre-molded sandwich semi-finished product directly adjacent thereto, as well as the high temperatures cause the cover layers to be welded cohesively to the plastic film resulting from the core layer.

It is precisely this compacted multilayer laminate as well as the transition region between the first and second minimum spacings which effectively forms a fluid-tight seal for the internal, adjacent, structured core layer.

Depending on the shape of the respective other pressing mold segment and the nature of its deflection relative to the oppositely arranged second pressing mold halve, a geometrically definable, three-dimensional transition contour of a constant or steep-flanked transition is formed between the region of the sandwich semi-finished product which was pre-molded with the aid of the first pressing mold segment and the region of the sandwich composite component which was finally molded with the respective other pressing mold segment.

After pressing but before final molding of the component, the shaped sandwich component dwells for a few seconds longer in the pressing tool to allow cooling. During this time, the thermoplastic matrix of all cover layer regions sets fully, and the component temperature falls generally. At this point, the residual negative pressure may be used advantageously to reduce air inclusions and improve the surface quality.

In a preferred variant, warming of the flat sandwich semi-finished product takes place by use of infrared radiation in such a manner that those areas of the sandwich semi-finished product which in the second pressing process, are joined to form a fluid-tight component periphery and/or undergo greater reduction of the core layer thickness, within the shape transition geometries, for example, are warmed so that those regions overheat and lose some thickness or height through spontaneous melting, in some cases after the IR radiation heating or before shaping.

Subsequently, this enables better cohesive bonding between the cover layer matrix in the three-layer laminate and the shaped core layer which melted into a plastic film and was reshaped, as well as less marked buckling of the core ridges in adjacent transition geometries within the core layer.

The method according to the invention may also be combined directly with thermoplastic injection molding, thus allowing another degree of freedom of form.

A sandwich composite component constructed according to the invention with a pressed two- or three-dimensional shape, having at least one structured core layer made of thermoplastic material and having two opposite core layer surfaces, and which comprises thermoplastic cover layers, each of which is cohesively bonded directly or indirectly to the two core layer surfaces, is characterized by having at least one three-dimensional transition contour, which monolithically connects a first region of the sandwich composite component, in which the structured core layer separates the two cover layers from each other, to an adjacent second region of the sandwich composite component, in which the structured core layer has a plastic film and both cover layers are contained, forming a compacted and welded multilayer laminate.

The three-dimensional transition contour, which is preferably embodied as a steep-flanked or as a flat chamfer, extends around the edge, along a peripheral circumferential border of the sandwich composite component. In combination therewith or alternatively thereto, it is possible to provide the transition contour inside the sandwich composite component such that the first region, in which the structured core layer is contained and separates the two cover layers from each other, and surrounds at least a part of the second region.

The sandwich composite component according to the invention may have a three-dimensional deformation in the first region which deviates from a flat surface extension at least in areas thereof, for example in the form of a wavy curvature of the flat composite consisting of the structured core layer and the two cover layers.

Both cover layers of the sandwich composite component are preferably made from a thermoplastic material to which endless fiber components, preferably in the form of aramid, carbon, ceramic, glass, quartz or basalt fibers have been added. The individual fibers are ideally dimensioned and arranged such that they pass once completely through the sandwich semi-finished product and are arranged approximately unidirectionally in at least one layer, or they are a woven structure.

The sandwich composite component according to the invention may preferably be used as a load-bearing component in the automotive, caravan, shipbuilding and aircraft construction fields, or as a load-bearing structure for photovoltaic modules or for solar thermal energy modules or in the sports industry.

BRIEF DESCRIPTION OF THE DRAWINGS

In the following text, the invention will be described for exemplary purposes without limitation of the general inventive thought, on the basis of exemplary embodiments, with reference to the drawing. In the drawing:

FIGS. 1a)-c) Show a sequence of images illustrating the shaping of a sandwich composite component with a structure-receiving core layer and fluid-tight component periphery according to the invention;

FIG. 3a) Shows a longitudinal section through a finished sandwich composite component; and FIGS. 3b)-g) Show detail views of longitudinal sections.

DETAILED DESCRIPTION OF THE INVENTION

Figure 1:
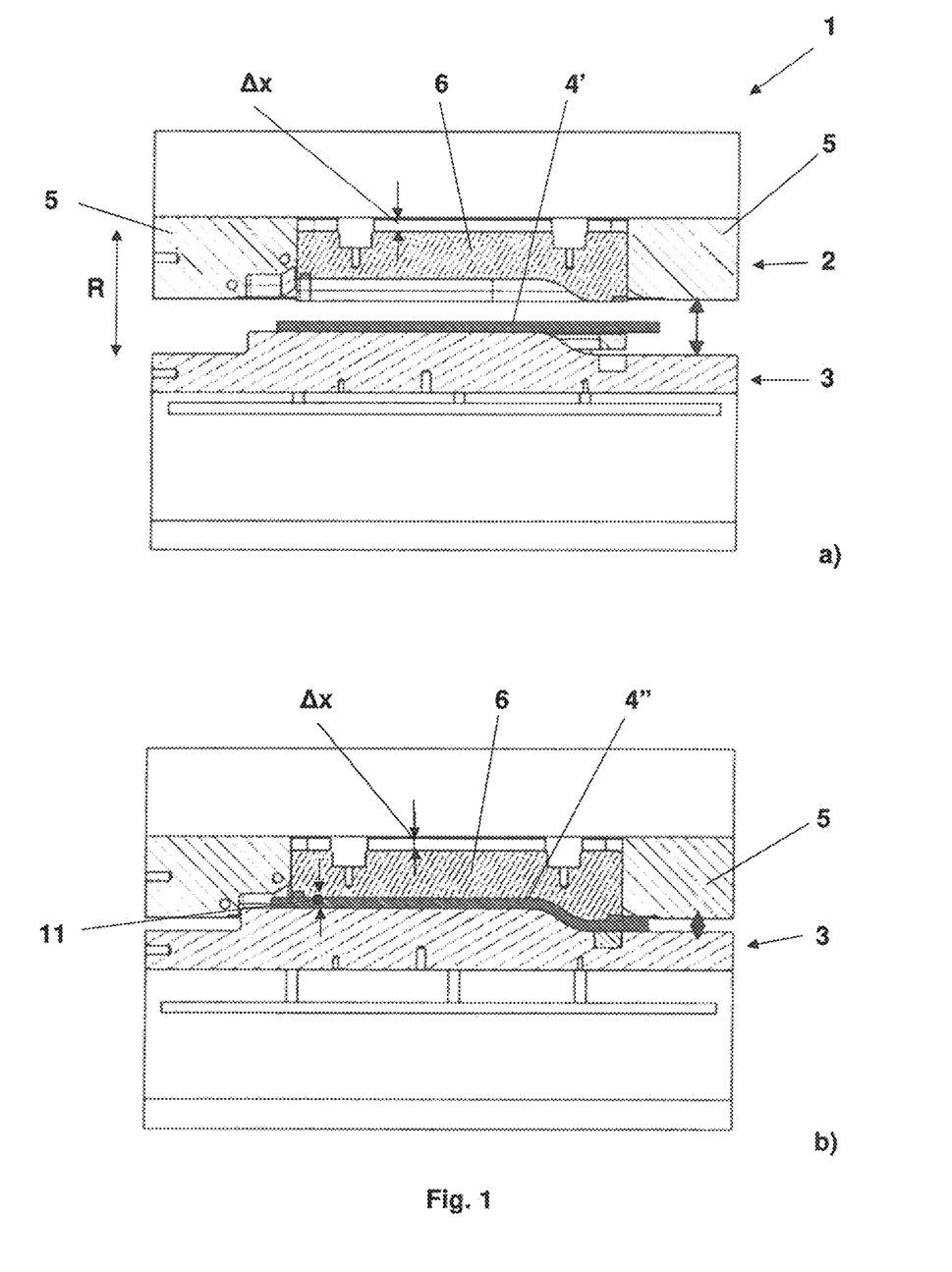
Figure 1C:
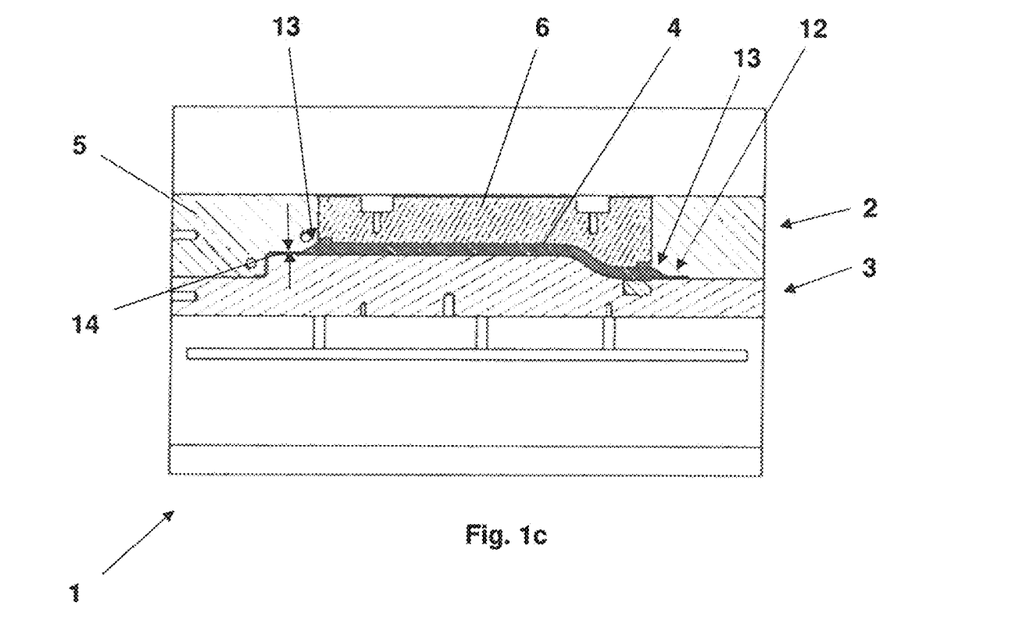

The method according to the invention enables production of a two- or three-dimensionally shaped sandwich composite component 4 in two consecutive process steps using a pressing tool 1 from a flat sandwich semi-finished product 4' with a structured core layer 8 and two cover layers 9 which cover it on both sides within a cycle time from one to a few minutes. The two consecutive process steps for the shaping are initiated during a linear tool closing movement of mold halves. The linear closing movement is performed with the aid of a vertically or horizontally closing pressing tool which will be explained below with reference to FIGS. 1a) to c).

FIGS. 1a) to c) each illustrate a cross-sectional representation through a pressing tool 1 in chronologically successive method situations. The pressing tool 1 has two preferably metal pressing mold halves 2, 3, which in the closed state enclose a cavity, inside of which the sandwich composite component 4 to be produced is ultimately formed as illustrated in FIG. 1c).

The pressing tool 1 is equipped with two deflectable pressing mold halves 2, 3 which are linearly movable along a spatial direction R, preferably vertically as shown, or horizontally, of which the upper, first pressing mould halve 2 as shown comprises two pressing mold segments 5, 6 which are mounted in a linearly movable manner relative to each other along the spatial direction R. The second pressing mold halve 3 is positioned opposite the first pressing mold halve 2 and is constructed as a single part in this case.

In the starting situation represented in FIG. 1a), the first pressing mold segment 6 is deflected relative to the respective other pressing mold segment 5 by a distance $\Delta x$ and protrudes downwards with respect to the respective other pressing mold segment 5. Such a configuration enables a two-stage pressing process with interim stabilization of the initially reshaped geometry.

Vacuum cups, which are preferably made from air-permeable materials such as porous aluminium, metal foams or sintered metals, are integrated in the pressing mold segments 5, 6 and on the surface of the lower pressing mold halve 3, and are connected to a corresponding negative pressure source provided on the tool side.

In the situation shown in FIG. 1a), a flat sandwich semi-finished product 4' is lying on the surface of the lower pressing mold halve 3.

Figure 2:
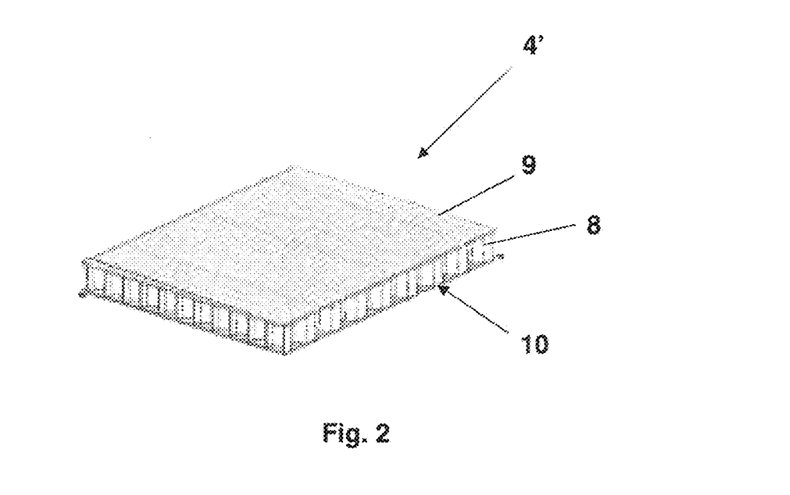
FIG. 2 Represents a sandwich semi-finished product with a flat construction.

FIG. 2 represents a flat sandwich semi-finished product 4' of such kind, which has a structured core layer 8 and two cover layers 9, 10 which are each made from the same thermoplastic material. The core layer 8 has a structured construction in the form of honeycombs or cylinders arranged side by side. The cover layers 9, 10 contain endless fibers for the purpose of reinforcement, wherein the individual fibers ideally pass entirely through the semi-finished product once and are arranged unidirectionally in at least one layer or are provided as a woven structure.

The sandwich semi-finished product 4' represented in FIG. 2 is brought to a certain thermal state before or while it is placed in the pressing tool 1. The defining feature of this thermal state is that the thermoplastic material of the cover layers 9 and 10 reaches temperatures above its melting temperature, and the thermoplastic material of the core layer 8 reaches temperatures equal to or below its melting temperature. Heating of the sandwich semi-finished product 4' preferably takes place immediately before the shaping with the aid of infrared radiation warming applied to both sides.

The two-stage pressing process begins with a closing movement of the pressing tool 1, in which the first pressing mold halve 2 is deflected relative to the second pressing mold halve 3, in the present case vertically downwards. The sandwich semi-finished product 4' is attached at least to the underside thereof before and during the shaping by vacuum cups.

FIG. 1b) represents the situation in which the upper pressing mold halve 2 has been lowered vertically, and the originally flat sandwich semi-finished product 4' has been pre-shaped by contact with the leading first pressing mold segment 6 with the application of pressing force. Pre-pressing of the sandwich semi-finished product 4' was carried out while preserving the structure of the core layer 8. This shaping process for obtaining the pre-shaped sandwich semi-finished product 4" illustrated in FIG. 1b ends when a minimum spacing 11 between pre-shaped sandwich semi-finished product 4" is reached. The first minimum spacing 11 corresponds to a maximum layer thickness of the pre-pressed sandwich semi-finished product 4'. Preferably, all contact regions close to the subsequent transition contour between the cover layers 9, 10 of the sandwich semi-finished product 4' and the surfaces of the first pressing mold segment 6 as well as the second pressing mold half 3 are supplied with negative pressure during the pre-pressing, with the result that the effect of the negative pressure on the contact regions between sandwich semi-finished product 4" and pressing mold tool 1 serves to prevent at least one of core failure and undesirable core height reduction of the core layer 8.

In the time before a second, subsequent pressing process step is carried out, the pre-shaped sandwich semi-finished product 4" is stored and cooled inside the pressing mold segment 6 which is in contact with the sandwich semi-finished product 4" and the pressing mold halve 3 without any further molding forces that would modify the shape of the pre-shaped sandwich semi-finished product 4". The sandwich semi-finished product is cooled by contact cooling through contact on both sides of the pre-pressed sandwich semi-finished product 4" on the opposite contact regions. This brings about partial to total solidification of the thermoplastic material of the contacted cover layers at the previously melted cover layer surface regions. This targeted solidification and the adhesion of the sandwich semi-finished product 4" to the leading pressing mold segment 6 is preferably due to negative pressure having the effect of stabilizing these sandwich regions. The stabilization reduces or entirely prevents undesirable deformations on the pre-pressed sandwich semi-finished product in the subsequent, second pressing process step. The duration of this stabilizing state is at least 1 second.

In a second pressing process step, the previously uncontacted sub-regions of the sandwich semi-finished product 4" are reshaped and pressed by deflection of the respective other pressing mold segment 5 against the opposite second pressing mold halve 3, while the first pressing mold segment 6 rests relative to the second pressing mold halve 3. As the closing movement progresses, the sandwich core is compressed in the regions laterally outside the first pressing mold segment 6 until a second minimum spacing 14 is reached between the respective other pressing mold segment 5 and the second pressing mold half 2, thus forming a compacted laminate 12. These compacted component regions 12 may be molded to extend around the periphery of at least one of the component and in the interior of the sandwich component depending on the component shape and the design of the pressing mold segments (5, 6).

The transition 13 between the structurally preserved core layer regions and the peripheral compacted laminate region 12 may have a steep-flanked or be constant depending on the construction and shape of the pressing mold segments.

The pressing method explained here may be combined with other conventional processing steps according to the pressing tool used or even the injection molding machine used, such as for example a subsequent edge trimming with punches or further functionalization by injection molding.

The sandwich composite components produced with the method according to the invention may include both flat and curved sandwich regions with defined core height. The core height depends in each case on the gap width inside the cavity as illustrated in FIG. 1c).

The transition 13 between regions in which the sandwich composite component 4 is shaped with a core layer whose structure is preserved and the adjacent compacted laminate regions 12 may be shaped as a chamfer, for example.

After the pressing and before the final molding of the component, the shaped sandwich component dwells in the pressing tool for a few seconds longer in order to cool. In this time, the thermoplastic matrix of all cover layer regions solidifies, and the component temperature generally cools down. In this situation, the remaining negative pressure may be used advantageously to reduce air inclusions and improve the surface quality.

The compacted laminate which extends circumferentially around the periphery of the component, may seal the interior of the sandwich against penetration by air and fluids, and at the same time may serve as a joint. It is also possible to create compact laminate regions as with corresponding transitions inside the finished sandwich composite component 4.

Figure 3:
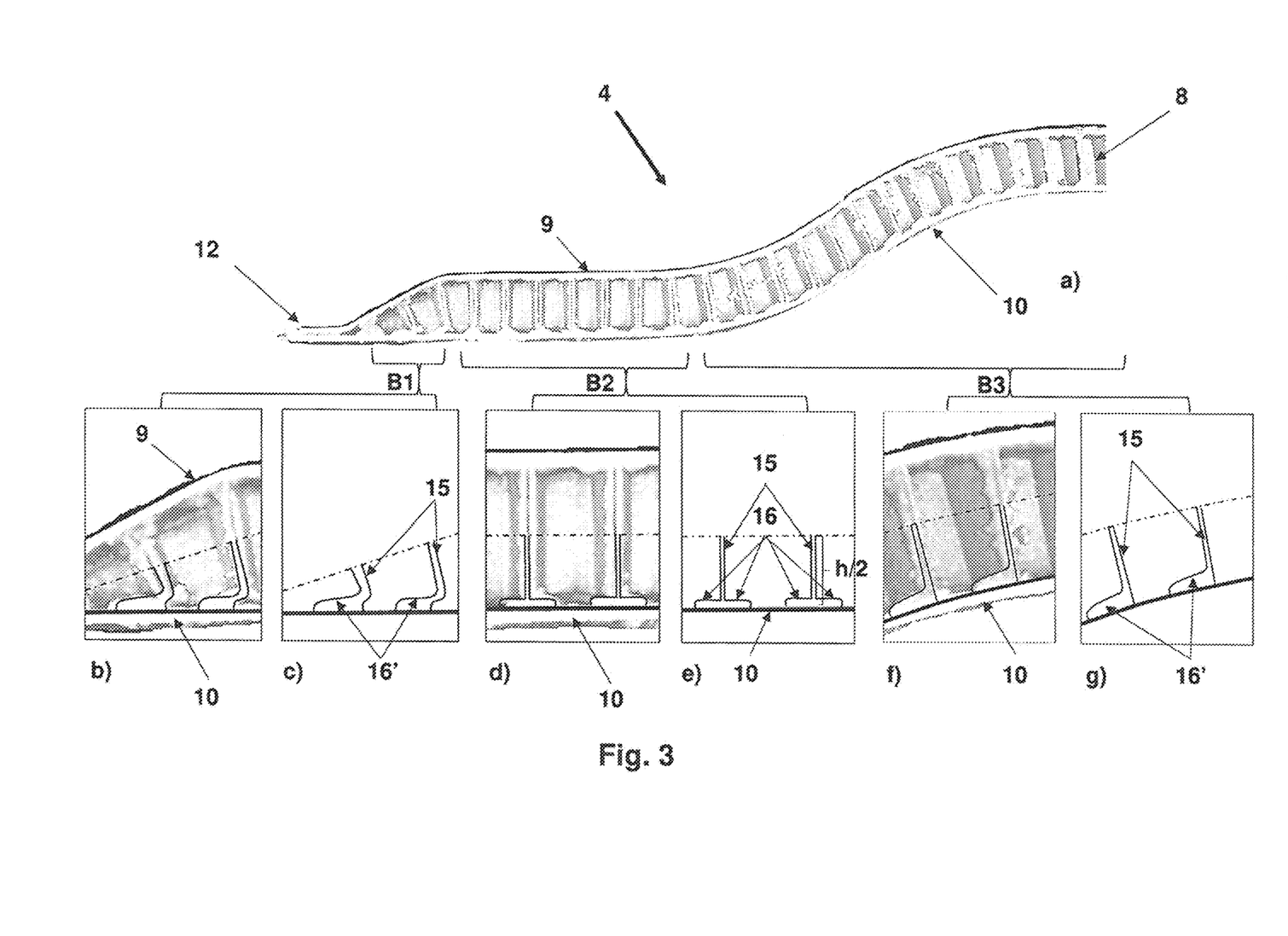

FIG. 3a) shows a longitudinal section through a finished sandwich composite component 4, which besides a peripheral compacting 12, in which both cover layers 9, 10 are pressed jointly with the core layer 8 to form an integral or practically integral material composite, contains the transition region B1, an unshaped region B2 adjacent thereto, and subsequently a 2D- and 3D-shaped region B3.

The transition region B1 is illustrated in detail in FIGS. 3b) and 3c), of which FIG. 3b) is a photographic detailed representation showing both cover layers 9, 10 and the structure walls of the core layer 8 arranged between them, and FIG. 3c) shows a schematic partial longitudinal section in which the respective lower half of the longitudinal section is shown in the transition region B1. FIGS. 3d) and e) show corresponding illustrations for the unshaped region B2, and FIGS. 3f) and g) for the shaped region B3.

The preferably honeycomb-like core layer 8 includes structure walls 15, whose opposite structure wall edges are each cohesively joined to one of the two cover layers 9, 10 wherein a material accumulation 16 of thermoplastic material similar to a weld bead is provided on each side of the structure wall borders are joined to a cover layer 9, 10. The accumulation is bonded integrally with both the cover layer 9, 10 and the structure wall 15.

In transition region B1, the structure wall height becomes lower, starting from the unshaped structure wall height h in region B2 and progressing downwards, forming a complete film structure with the cover layers 9, 10 in the edge region of the compacting 12. Due to the height reduction caused by pressing forces and the maximum temperatures in the structure walls 15 close to the cover layers 9, 10 and the cover layers 9, 10 themselves, which are hotter than the melting temperature of the thermoplastic matrix, the structure walls 15 begin to deform, at least in the region close to the cover layers 9, 10 and themselves melt into the weld-bead like material accumulation. This results in a stronger weld-bead like material accumulation with further reduction of the structure wall height h. Moreover, shearing forces lead to a deformation of the material accumulations 16 tangentially to the cover layers 9, 10 relative to the structure wall 15 in each case. Foot-like deformations 16' are formed, from which the structure walls 15 extend.

The structure walls 15 extend substantially linearly between the two cover layers 9, 10 within the unshaped sandwich composite component region B2. Weld bead-like material accumulations 16 of thermoplastic material are located on both sides of each of their structure wall borders, and are each bonded monolithically in these regions with both the cover layers 9, 10 and the structure walls 15.

Inside the region B3 of the sandwich composite component 4 with a pressed two- or three-dimensional shape, the weld bead-like material accumulations 16 of thermoplastic material exhibit a shear force-induced deformation which extends unidirectionally with the adjacent cover layer such that an increasing material accumulation 16' forms on one side of the structure wall borders depending on the curvature, as may be seen particularly clearly in the detail illustrations of FIGS. 3f) and g). Ideally, the structure walls 15 are largely unshaped, that is straight, in this region B3 as well. However, deviating structure wall deformations may occur, caused by excessively steep curvatures of the sandwich composite component 4, too rapid reduction of the structure wall height h in regions B2 and B3 and/or by the temperature being too low in the cover layers 9,10, which then results in blockage of the sliding motion from the cover layers 9,10 on the structure walls 15 and therefore results less in shear-induced deformation of the weld-bead like material accumulations 16, then instead to a shear-induced deformation of the structure walls 15 themselves. Insufficient high cover layer temperatures are attributable to inadequate thermal energy input during the heat treatment with at least one of IR radiation and excessively long transfer time from the time of completion of the IR radiation heat treatment to the start of the first pressing process step.

LIST OF REFERENCE NUMERALS

1 Pressing tool
2 First pressing mold half
3 Second pressing mold half
4 Sandwich composite component
4' Flat sandwich semi-finished product
4" Pre-pressed sandwich semi-finished product
5 Respective other pressing mold segment
6 First pressing mold segment
7 Flat sandwich semi-finished product
8 Core layer
9, 10 Cover layer
11 First minimum spacing
12 Compacted layer composite
13 Transition
14 Second minimum spacing
15 Structure wall
16 Material accumulation
16' Single-sided material accumulation
B1 Transition region
B2 Unshaped region
B3 Shaped region

The invention claimed is:

1. A method for producing a sandwich composite load-bearing component product comprising a pressed shape having a structured core with two opposed core surfaces and cover layers each respectively being cohesively bonded to one of the two opposed core surfaces, and the structured core and the cover layers are made of the same thermoplastic material, the method comprising steps in order as presented below:

contactlessly heating with infrared radiation a flat semi-finished sandwich product including the structured core and the cover layers being respectively joined to the two opposed core surfaces of the structured core, the structured core during the heating attaining a temperature below a melting temperature of the thermoplastic material, while at least parts of the opposed cover layers have a temperature equal to or above the melting temperature;

transferring the heated flat semi-finished sandwich product into a pressing tool comprising a first pressing mold halve and a second pressing mold halve, each of the pressing mold halves being linearly movable relative to each other in a spatial direction, the first pressing mold halve including at least two pressing molding segments, each of the pressing molding segments being movable linearly in the spatial direction so that at least regions of the semi-finished sandwich product move into surface contact with at least one of the first and the second pressing mold halves;

moving the first and the second pressing mold halves in the spatial direction towards each other to cause at least one region of the semi-finished sandwich product to make surface contact with at least one of the first and the second pressing mold halves so that one of the at least two pressing mold segments moves spatially ahead of the other of the at least two pressing mold segments to cause the at least one region to come into contact with one of the two cover layers, together with the first and the second pressing mold halves pressing the semi-finished sandwich product in two or three dimensions to reach a first minimum thickness corresponding to a greatest thickness of the pre-pressed semi-finished sandwich product between the one of the at least two pressing mold segments and the second pressing mold halve;

stabilizing the pre-pressed semi-finished sandwich product in the at least one region contacted by the one of the at least two pressing mold segments and the second pressing mold halve by cooling the one of the at least two pressing mold segments by contact with the second pressing mold halve;

deflecting the other of the at least two pressing mold segments in the spatial direction to contact the second pressing mold halve, while the one of the at least two pressing mold segments rests relative to the second pressing mold halve; and contacting some regions of the pre-pressed semi-finished sandwich product with the other of the at least two pressing mold segments and completing pressing of the semi-finished sandwich product by moving the other of the at least two pressing mold segments in the spatial direction until a second minimum spacing is reached between the other of the at least two pressing mold segments and the second mold halve in the spatial direction to produce the second minimum spacing of the semi-finished sandwich product which is smaller than the first minimum spacing to produce the sandwich composite component product which has been pressed in two or three dimensions; and wherein the structured core comprises side by side honeycombs or cylinders, and wherein height of walls of the structured core is reduced by melting into a weld bead which accumulates in a region of the sandwich composite component product, where the structured core and the cover layers are cohesively bonded together.

2. A method according to claim 1, comprising: retaining the semi-finished sandwich product in at least one of the two pressing mold halves and one of the at least two pressing mold segments by application of a negative pressure to cause suction in at least one of the regions between the semi-finished sandwich product and the pressing mold halves, and cooling the semi-finished sandwich product in at least one region by contact with the second pressing mold halve.

3. A method according to claim 1, comprising: moving the first and the second pressing mold halves in the spatial direction towards each other to finish the pre-pressed semi-finished sandwich product and then moving the other of the at least two pressing mold segments in the spatial direction toward the second pressing mold halve, and contacting the pre-pressed semi-finished sandwich product adjacent to at least one region which is not pre-pressed, and then compacting the pre-pressed semi-finished sandwich product in the at least one region by application of a pressing force to reduce a thickness to the second minimum spacing.

4. A method according to claim 3, comprising: providing endless fibers passing completely through the semi-finished sandwich product which are arranged unidirectionally in at least one layer or in a woven structure.

5. A method according to claim 1, comprising:
a composite material within a region which is finally molded by one of the pressing mold halves.

6. A method according to claim 1, comprising: moving the at least two pressing mold segments to form a three-dimensional transition contour having either a constant or an inclined transition between at least one region of the pre-pressed semi-finished sandwich product and another region of the sandwich composite component product which is finally molded.

7. A method according to claim 6, comprising:
during the stabilization, the pre-pressed semi-finished sandwich product is cooled by contact between one of the at least two pressing mold segments and the second pressing mold halve.

8. A method according to claim 1, wherein: cooling of the semi-finished sandwich product provides a solidification of the thermoplastic material while the pre-pressed semi-finished sandwich product is retained by negative pressure in regions of contact with the one of the at least two pressing mold segments and the second of the pressing mold halves.

9. A method according to claim 1, comprising:
stabilizing the pre-pressed semi-finished sandwich product without molding forces acting on the pre-pressed semi-finished sandwich product for a period of at least 1 second.

* * * * *